US010410504B2

(12) United States Patent
Tabe

(10) Patent No.: US 10,410,504 B2
(45) Date of Patent: Sep. 10, 2019

(54) SYSTEM AND METHOD FOR INTERACTIVE SECURITY

(71) Applicant: Google Inc., Mountain View, CA (US)

(72) Inventor: Joseph Akwo Tabe, Silver Spring, MD (US)

(73) Assignee: GOOGLE LLC, Mountain View, CA (US)

( * ) Notice: Subject to any disclaimer, the term of this patent is extended or adjusted under 35 U.S.C. 154(b) by 224 days.

(21) Appl. No.: 15/233,562

(22) Filed: Aug. 10, 2016

(65) Prior Publication Data

US 2016/0351043 A1 Dec. 1, 2016

Related U.S. Application Data

(63) Continuation of application No. 14/645,448, filed on Mar. 12, 2015, now abandoned, which is a
(Continued)

(51) Int. Cl.

| | |
|---|---|
| *H04N 21/81* | (2011.01) |
| *G08B 21/22* | (2006.01) |
| *G08B 13/196* | (2006.01) |
| *G08B 25/08* | (2006.01) |
| *G08B 25/14* | (2006.01) |

(Continued)

(52) U.S. Cl.
CPC ....... *G08B 21/22* (2013.01); *G08B 13/19697* (2013.01); *G08B 19/005* (2013.01); *G08B 25/085* (2013.01); *G08B 25/14* (2013.01); *H04N 7/181* (2013.01); *H04N 21/21* (2013.01); *H04N 21/23* (2013.01); *H04N 21/4131* (2013.01); *H04N 21/4223* (2013.01); *H04N 21/42201* (2013.01); *H04N 21/42202* (2013.01); *H04N 21/4524* (2013.01); *H04N 21/4532* (2013.01); *H04N 21/4788* (2013.01); *H04N 21/814* (2013.01)

(58) Field of Classification Search
CPC . G06F 19/3418; G08B 29/00; G08B 21/0492; G08B 21/088
See application file for complete search history.

(56) References Cited

U.S. PATENT DOCUMENTS

| | | |
|---|---|---|
| 4,635,124 A | 1/1987 | Andreatti et al. |
| 5,023,901 A | 6/1991 | Sloan et al. |
| (Continued) | | |

*Primary Examiner* — Aftab N. Khan
(74) *Attorney, Agent, or Firm* — Morris & Kamlay LLP

(57) ABSTRACT

A home security system includes interactive sensors and a controller in a controlled environment, such as a smart home environment. A central communication device is coupled, wired or wirelessly, directly or indirectly, to the interactive sensors and the controller. The interactive sensors include at least one heartbeat sensor to detect the presence of one or more human bodies and at least one emergency condition sensor to detect the presence of an emergency condition. In some implementations, the controller may determine the number of occupants based on the heartbeats of multiple human bodies detected by the heartbeat sensor. In some implementations, the number of occupants may be determined by the heartbeats detected by the heartbeat sensor in conjunction with one or more other types of sensors, such as a body heat sensor.

18 Claims, 10 Drawing Sheets

Related U.S. Application Data continuation-in-part of application No. 11/634,535, filed on Dec. 5, 2006, now abandoned.

(60) Provisional application No. 60/721,103, filed on Dec. 8, 2005.

(51) Int. Cl.
    *H04N 7/18*     (2006.01)
    *H04N 21/21*     (2011.01)
    *H04N 21/23*     (2011.01)
    *H04N 21/41*     (2011.01)
    *H04N 21/422*     (2011.01)
    *H04N 21/4223*     (2011.01)
    *H04N 21/45*     (2011.01)
    *H04N 21/4788*     (2011.01)
    *G08B 19/00*     (2006.01)

(56) References Cited

U.S. PATENT DOCUMENTS

| | | | |
|---|---|---|---|
| 6,112,103 A * | 8/2000 | Puthuff | H04M 1/247 |
| | | | 455/550.1 |
| 6,762,686 B1 | 7/2004 | Tabe et al. | |
| 6,965,294 B1 | 11/2005 | Thyen et al. | |
| 6,970,183 B1 * | 11/2005 | Monroe | G08B 7/062 |
| | | | 348/143 |
| 7,544,941 B2 | 6/2009 | Gorman et al. | |
| 7,864,980 B2 | 1/2011 | Evans et al. | |
| 2003/0048926 A1 | 3/2003 | Watanabe et al. | |
| 2003/0062997 A1 * | 4/2003 | Naidoo | G08B 13/19656 |
| | | | 340/531 |
| 2003/0067542 A1 | 4/2003 | Monroe et al. | |
| 2003/0176798 A1 * | 9/2003 | Simon | A61B 5/0006 |
| | | | 600/509 |
| 2004/0113770 A1 * | 6/2004 | Falk | G08B 13/19645 |
| | | | 340/531 |
| 2004/0143602 A1 * | 7/2004 | Ruiz | G08B 13/122 |
| 2004/0233282 A1 * | 11/2004 | Stavely | G08B 13/19602 |
| | | | 348/143 |
| 2005/0184870 A1 * | 8/2005 | Galperin | G08B 13/2462 |
| | | | 340/568.2 |
| 2005/0225448 A1 * | 10/2005 | Schenker | A61B 5/02055 |
| | | | 340/573.1 |
| 2005/0275528 A1 * | 12/2005 | Kates | G08B 1/08 |
| | | | 340/539.22 |
| 2006/0022816 A1 * | 2/2006 | Yukawa | G08B 25/006 |
| | | | 340/521 |
| 2006/0049940 A1 * | 3/2006 | Matsuhira | G08B 13/19645 |
| | | | 340/541 |
| 2006/0109341 A1 | 5/2006 | Evans et al. | |
| 2006/0171453 A1 | 8/2006 | Rohlfing et al. | |
| 2006/0214785 A1 * | 9/2006 | DeVaul | G08B 21/0211 |
| | | | 340/539.11 |
| 2007/0103542 A1 | 5/2007 | Carter et al. | |
| 2007/0256105 A1 | 11/2007 | Tabe et al. | |
| 2007/0298772 A1 * | 12/2007 | Owens | G08B 13/19658 |
| | | | 455/414.1 |
| 2008/0001734 A1 | 1/2008 | Stilp et al. | |
| 2008/0117299 A1 | 5/2008 | Carter et al. | |
| 2008/0216765 A1 | 9/2008 | Kates et al. | |
| 2011/0001812 A1 * | 1/2011 | Kang | G08B 13/00 |
| | | | 348/77 |
| 2012/0092156 A1 * | 4/2012 | Tran | G06F 19/3418 |
| | | | 340/539.12 |

* cited by examiner

SYSTEM AND METHOD FOR INTERACTIVE SECURITY

CROSS REFERENCE TO RELATED APPLICATIONS

This application is a continuation of U.S. application Ser. No. 14/645,448, filed on Mar. 12, 2015, titled "System and Method for Interactive Security," published as U.S. Patent Application Publication No. 2015/0187192 A1 and incorporated by reference herein in its entirety, which is a continuation-in-part (CIP) of U.S. application Ser. No. 11/634,535 filed on Dec. 5, 2006, titled "Entertainment Device Configured for Interactive Detection and Security Vigilant Monitoring in Communication with a Control Server," published as U.S. Patent Application Publication No. 2007/0256105 A1 and incorporated by reference herein in its entirety, which in turn claims priority of U.S. Provisional Application No. 60/721,103, filed on Dec. 8, 2005, and incorporated by reference herein in its entirety.

BACKGROUND

1. Field

Embodiments of the present invention generally relate to a system and method for area surveillance, and particularly to a system and method for interactive monitoring and security of an area.

2. Description of Related Art

The innovation of the information age has revealed new and exciting opportunities for interactive high definition television capabilities. Personal televisions have been deployed in a variety of arenas to gain image clarity and efficiencies, reduce cost, and increase productivity. Miniaturization and portability have made personal televisions more accessible and a more valued tool in many business environments. Personal televisions have also become a very useful tool in non-business environments, including educational institutions and homes.

Home television network in connection with a computing device means are gaining increased popularity. Within a home, multiple personal televisions can be connected together in the home and/or used for office computing device to permit a user to share security data and other data without having to manually carry a camera from one room to another. The television network in connection with a computing device means also permits the user to receive detected data, share printers, fax machines, and other devices or reach other distant destination. Internet access facilities can also be provided to permit access to external networks and services. Thus, a user can operate an interactive high definition television through his cell phone in communication with a server to gain instant access to information source from anywhere in the world.

Despite the increasing presence of home television network in connection with a computing device means, several significant problems must be overcome. For example, installing a home detection network can be time extensive and expensive to deploy. Additionally, there is no easy method to integrate home television network in connection with a computing device means with other residential, commercial/industrial devices, destination, such as televisions, stereos, cell phones, DVD distributors, and other home electronics. Being able to efficiently distribute digital audio/video (AV) data among personal televisions and other AV devices, destination such as, televisions, DVD distributors, PVRs, etc. is complicated by differing and evolving detection and communications standards and/or formats.

Another significant challenge is being able to effectively control the networked residential, commercial/industrial devices. Although a remote control unit can be trained to send signals to components of an entertainment center such as, a television, stereo, and VCR, there is no known central device that can communicate and control multiple personal televisions and other analog and/or digital devices, destination at offices and residence or office environment.

Although the combination of improved interactive high definition television capabilities and global access to detection information has resulted in significant advancements in the information processing age, there exists a need for a simple, inexpensive, yet versatile system that can integrate the functions of interactive high definition television into multiple security and detection devices for residential, commercial/industrial/office and connected to a residential, commercial/industrial/office network and access-able from any remote location to enable home protection from physical theft, un-authorized entry, burglary, etc.

SUMMARY

Embodiments in accordance with the present invention provide an interactive security system, method, and device for monitoring a controlled environment, detecting an emergency condition in the controlled environment and generating an alarm based on existence of the emergency condition.

In an embodiment, the present invention provides an interactive security system for monitoring a controlled environment, detecting an emergency condition in the controlled environment and generating an alarm based on existence of the emergency condition. The interactive security system includes plurality of sensors positioned at one or more predetermined locations in the controlled environment. The plurality of sensors are associated with a sensor, the sensor being configured to collect sensor data in the controlled environment. The plurality of sensors include at least one human body sensor configured to detect a human body presence in the controlled environment. The plurality of sensors further include at least one emergency condition sensor configured to detect an emergency condition within the controlled environment. A control server communicatively coupled to the sensor is configured to receive, store, and process the sensor data and generate an alarm based on detection of at least one of, the human body, the emergency condition or a combination thereof.

In an embodiment, the present invention discloses a method for monitoring a controlled environment, detecting an emergency condition in the controlled environment and generating an alarm based on existence of the emergency condition. The method includes receiving sensor data for the controlled environment from a sensor associated with the controlled environment. The method further includes processing the sensor data to determine an emergency condition and presence of a human body in the controlled environment and generating an alarm based on detection of at least one of, the emergency condition, the human body or a combination thereof.

In an embodiment, the present invention provides an interactive security media device for monitoring a controlled environment, detecting an emergency condition in the controlled environment and generating an alarm based on existence of the emergency condition. The media device includes a command interface for receiving a command from a control module where the control module is communicatively coupled to the media device. The media device further includes a communication interface for receiving sensor data from a sensor via a communication network, the sensor comprising a plurality of sensors positioned at one or more predetermined locations in a controlled environment. The media device further includes a display for displaying media content and the sensor data. The media device further includes a network interface for communicating with a remote command center external to the controlled environment. The media device further includes a processor communicatively coupled to the command interface, the control module, the communication interface, the display, and the network interface. The processor is configured to receive, store, and process the sensor data and display the sensor data on the display. The processor is further configured to generate an alarm based on detection of at least one of, presence of a human body in the controlled environment, detection of an emergency condition in the controlled environment or a combination thereof and provide the alarm information to the remote command center.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
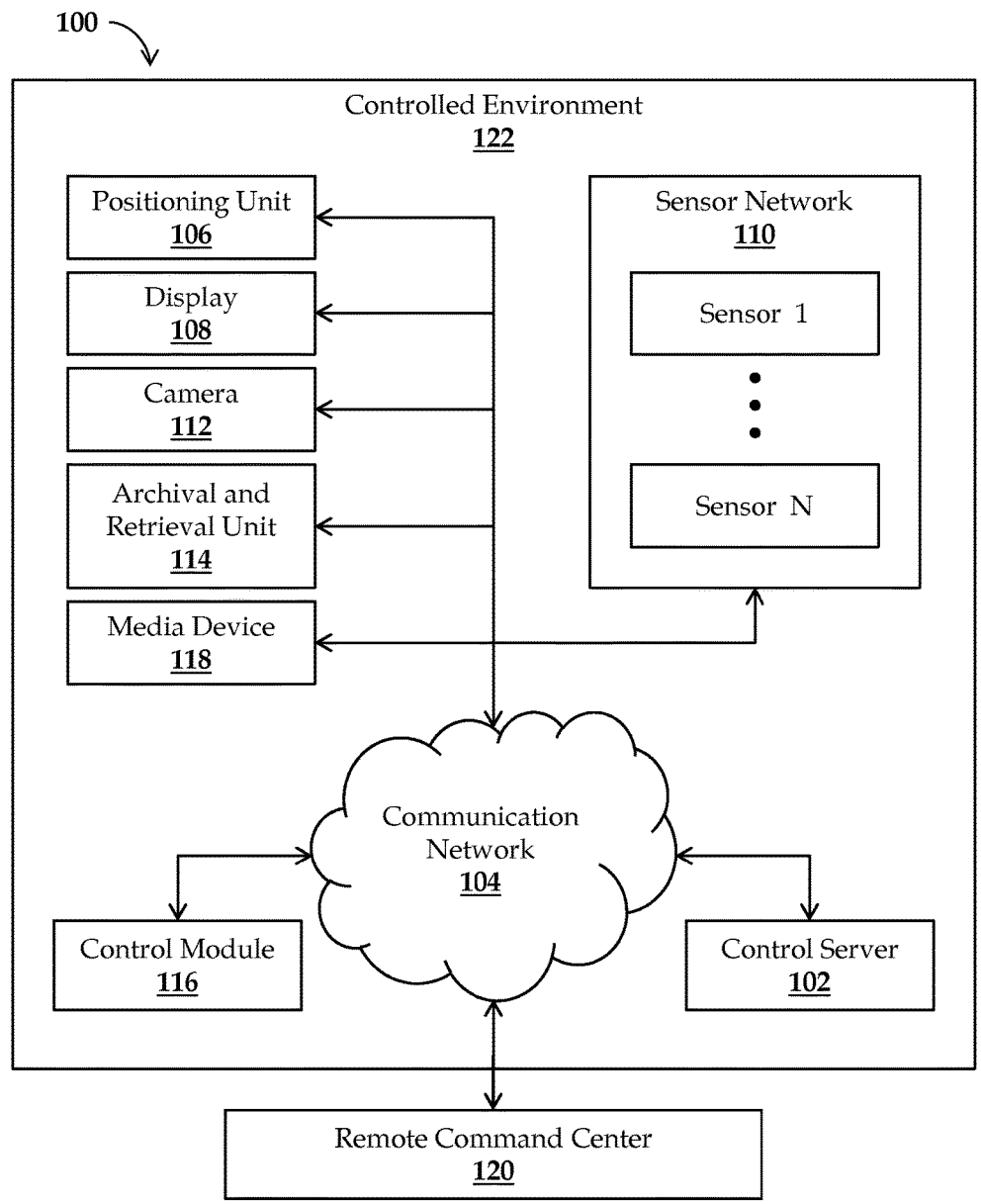
FIG. 1 illustrates a block diagram depicting a security system associated with a controlled environment, according to an embodiment of the present invention.

It is to be noted that the drawings presented are intended solely for the purpose of illustration and that they are, therefore, neither desired nor intended to limit the disclosure to any or all of the exact details of construction shown, except insofar as they may be deemed essential to embodiments of the claimed invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computing device-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computing device-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computing device can read.

A digital file attachment to e-mail or other self-contained information archive or set of archives is considered a distribution medium equivalent to a tangible storage medium. When the computing device-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of embodiments of the present invention can be separately claimed.

FIG. 1 illustrates a block diagram depicting a security system 100, according to an embodiment of the present invention. The security system 100 includes a control server 102 communicatively coupled to a positioning unit 106, a display 108, a sensor network 110, a camera 112, and an archival and retrieval unit (ARU) 114 through a communication network 104. The security system 100 may be installed in a geographical region, hereinafter referred to as "the controlled environment 122".

The control server 102 governs addition or deletion of a system component to the security system 100. In an embodiment, the control server 102 generates an environment profile to track and monitor all devices, destinations and applications within the controlled environment 122. A text-based or graphical interface enables a user to specify the location or dimensions of the controlled environment 122 for monitoring. The controlled environment 122 may include a home, an office, an educational institution, a medical institution, an industrial establishment, a residential building or any other commercial or residential space where monitoring and security of occupants is desired. The controlled environment 122 can be one or more rooms or designated areas within a room. Embodiments may also be used to control the operations and functions of system components located within the surrounding area of the controlled environment 122. Once the controlled environment 122 is established, the user can specify the system components that will be governed in the controlled environment 122 and enable communication with the control server 102. A system component announces its presence by broadcasting a detection control message on a continuous or periodically scheduled basis. The control server 102 receives the broadcast and adds the system component to the profile for that particular controlled environment 122 by extracting a detection type and properties for the system component from the detection message. The system component can be automatically interfaced with the environment profile. The user can expressly accept the profile change, or ignore it thereby allowing the profile change to be automatically approved.

With respect to updating the profile data, the control server 102 may also explicitly enable a request through at least one of the broadcast mechanism that all system components in the controlled environment 122 identify themselves through.

The security system 100 monitors positions of various objects, system components and human beings within the controlled environment 122 in real time. In an embodiment, the security system 100 utilizes one or more positioning units 106 for monitoring and tracking the location.

The positioning unit 106 includes an interactive detector as described in U.S. Pat. No. 6,762,686, which is incorporated in by reference herein in its entirety. The positioning unit 106 designates spatial locations within the controlled environment 122 for security system 100. The positioning unit 106 is communicatively coupled to the other system components such as the control server 102 via a wired and/or wireless interface. The positioning unit 106 is operable to be designated by coded means, to a floor or room within the controlled environment 122. The positioning unit 106 is also operable to designate a specific location within a floor or room. In an embodiment, the positioning unit 106 can be situated outside of the controlled environment 122 to thereby, designate external areas of protection for the controlled environment 122. In another embodiment, multiple positioning units 106 are distributed throughout the controlled environment 122. For example, the positioning units 106 may be located within, or mounted to, a wall, door, ceiling, floor, or the like of the controlled environment 122. The positioning units 106 can be coupled to the control module 116 or located as a stand-alone device within the controlled environment 122.

In another embodiment, the positioning unit 106 is part of a radio frequency (RF) communications system. A RF transponder interacts with a RF interrogator to communicate positioning information. The transponder is coupled to a system component and makes available identification information that uniquely identifies the system component. The transponder can make available other types of information, including an assigned location of the system component if the component is a stationary or infrequently moved device. The transponder can be coupled to either the control module 116 or the positioning unit 106. In an embodiment, the transponder is an active transponder. The active transponder transmits a continuous or periodic signal containing the identification information. In this embodiment, the position of the system component is being tracked and/or monitored in real time or near real time. In another embodiment, the transponder is a passive transponder. The passive transponder remains inactive or silent until it is activated by detection, an interrogator, or manually activated by the user. In this embodiment, the current position of the system component is not known to the security system 100 with certainty until the transponder is activated.

The interrogator is coupled to another system component and receives positioning information when it comes within the communications range of the transponder. The interrogator will automatically receive the positioning information from an active transponder, or will activate a passive transponder to receive the positioning information.

The interaction between the transponder and the interrogator can be explained with following illustration. The transponder is coupled to the control module 116 and the interrogator is coupled to or embodied within the positioning unit 106. When the user carrying the control module 116 enters the vicinity of the positioning unit 106, the positioning unit 106 receives identification codes from the control module 116. The identification codes may include an identifier for the control module 116. The positioning unit 106 sends the identification codes to the control server 102 for further processing. In an embodiment, the positioning unit 106 sends a vicinity identifier in response to detection of at least an object, wherein the object is responsible for the activation of devices in the controlled environment 122 where the positioning unit 106 is located. In another embodiment, the control server 102 determines the vicinity identifier from an identifier assigned to the positioning unit 120. For example, when the control module 116 is determined to be located within a dining area and enabled, the control server 102 will then allow the control module 116 to control system components positioned in the dining area.

The sensor network 110 is communicatively coupled to the control server 102 via the communication network 104. The sensor network 110 includes a plurality of sensors distributed throughout the controlled environment 122. The plurality of sensors may be configured to detect a variety of events or data in the controlled environment 122. The plurality of sensors may further be configured to detect a severity level of an emergency condition. For example, the plurality of sensors may determine severity of a fire accident in the controlled environment 122 and/or severity of burn injuries to a human being present in the controlled environment 122. A high resolution image of the human body may be used to determine severity of the burn injuries. The plurality of sensors may include an interactive sensor. The interactive sensor may analyze a detection severity within at least a frequency threshold value, and for providing at least a time map based on at least a classification of the human body. The interactive sensor may further determine a human body temperature of a human being present in the controlled environment 122.

The plurality of sensors may be positioned at predetermined locations in the controlled environment 122. The plurality of sensors may collect detection data in the controlled environment 122. The detection data may correspond to one or more events in the controlled environment 122. In an embodiment, the plurality of sensors may include a human body sensor configured to detect a human body presence in the controlled environment 122. The human body sensor may be a heat sensor, a heartbeat sensor, a voice sensor, a motion sensor or the camera 112. In an embodiment, the human body sensor may detect a position and a movement of a human being. The plurality of sensors may further include one or more emergency condition sensors configured to detect an emergency condition within the controlled environment. The emergency condition sensors may include a smoke sensor, a fire sensor, a temperature sensor, a break-through sensor, a pressure sensor, a sound sensor, a voice sensor, or the camera 112.

In an embodiment, the smoke sensor serves as a detection platform for the control server 102. The smoke sensor's ceiling-wall mounted base and direct connection to existing voltage AC power line of the controlled environment 122 provides an ideal platform for the control server 102 and enables information to be transported throughout the controlled environment 122 either through a wireless connection or through the power line. In this embodiment, the control server 102 can be housed within a wired/wireless access point, which provides the control server 102 with "always-on" connectivity. The smoke sensor may include a network interface card which enables the smoke sensor to provide the control server 102 with Home-PNA and/or wireless (e.g., IEEE 802.11 or 49.11) network connectivity. Since most smoke sensors are presently hard-wired into the controlled environment 122 power line, the smoke sensor platform also provides means of connectivity for the control server 102. Another advantage of using the smoke sensor as a detection platform for the control server 102 is that the smoke sensor can be ceiling/wall mounted to facilitate a greater communications range.

In an embodiment, electronic image sensors may be embedded in the sensor network 110. The image sensors may have mega-pixel resolution with optical/digital zoom arrays of a large number of very small light sensors, together called "mega-pixel resolution with optical/digital zoom arrays". The camera 112 comprises imaging components to produce an optical image of an emergency scene onto the mega-pixel resolution with optical/digital zoom array. The electronic image sensors convert the optical image detected into a set of electronic signals. The electronic image sensors may utilize arrays of CCD sensors for converting light into electrical signals. The camera 112 is communicatively connected to the control server 102. The camera 112 may include a control unit that enables remote control of various camera functions, such as pan, tilt, zoom, focus, and iris control. In an embodiment, the camera 112 includes one or more video cameras or camcorders and is installed in a media device 118. In an embodiment, the media device 118 may be an interactive high definition television.

The plurality of sensors may provide detection data to the control server 102 for further processing. The control server 102 may provide processed detection data to the archival and retrieval unit (ARU) 114 which is configured to receive compressed data streams, filter the streams for metadata such as, date, time, and source and store the streams and metadata for future retrieval. Further details of the ARU 114 are explained with reference to FIG. 3 below.

The control server 102 may provide processed detection data to the display 108 for playback of the detection data. The display 108 is a wired or wireless display that supports closed-circuit viewing. In an embodiment, the display 108 is a flat liquid crystal display (LCD) positioned on a wall or standing on a desk, table, or counter top. In an embodiment, the display 108 receives a streaming screen saver that displays static or dynamic images of a photograph, or a portrait when the display 108 is functioning in an inactive state. In an embodiment, the display 108 receives feeds from the media device 118.

The data from the plurality of sensors is analyzed by the control server 102 for determining an emergency condition. If an emergency condition exists in the controlled environment 122, the control server 102 may activate one or more alarms or response functions in the controlled environment 122. In another embodiment, the control server 102 intimates a remote command center 122 of the emergency condition. For example, if the detection data indicates a fire in the controlled environment 122, the control server 102 may activate water sprinklers and intimate the remote command center 120 about the fire incident. The control server 102 may transmit live data associated with the emergency condition to the remote command center 120.

Further, the control module 116 is a wired or wireless data processing device that enables a user to interact with the security system 100 and send control commands to the control server 102 and other devices. The control module 116 enables a user to remotely control the operations of various components of the security system 100. In an embodiment, a display of the control module 116 is capable of receiving video, text, and/or audio from other devices. In an embodiment, the control module 116 includes a flash ROM that enables wireless downloads and uploads of detection data about sections of the controlled environment 122.

Further, the communication network 104 of the security system 100 may include a wired and/or wireless local area network (LAN) or wide area network (WAN), such as an organization's intranet, a local internet, the global-based Internet including the World Wide Web, an extranet, a. virtual private network (VPN), licensed wireless telecommunications spectrum for digital cable and cell including CDMA, TDMA, GSM, EDGE, GPRS, CDMA2000, WCDMA FDD and/or TDD or TD-SCDMA technologies, or the like. The communication network 104 includes wired, wireless, or both transmission media and includes satellite, terrestrial such as fiber optic, copper, UTP, STP, coaxial, hybrid fiber-coaxial "HFC", or the like, radio, free-space optics, microwave, and/or any other form or method of transmission.

Figure 2:
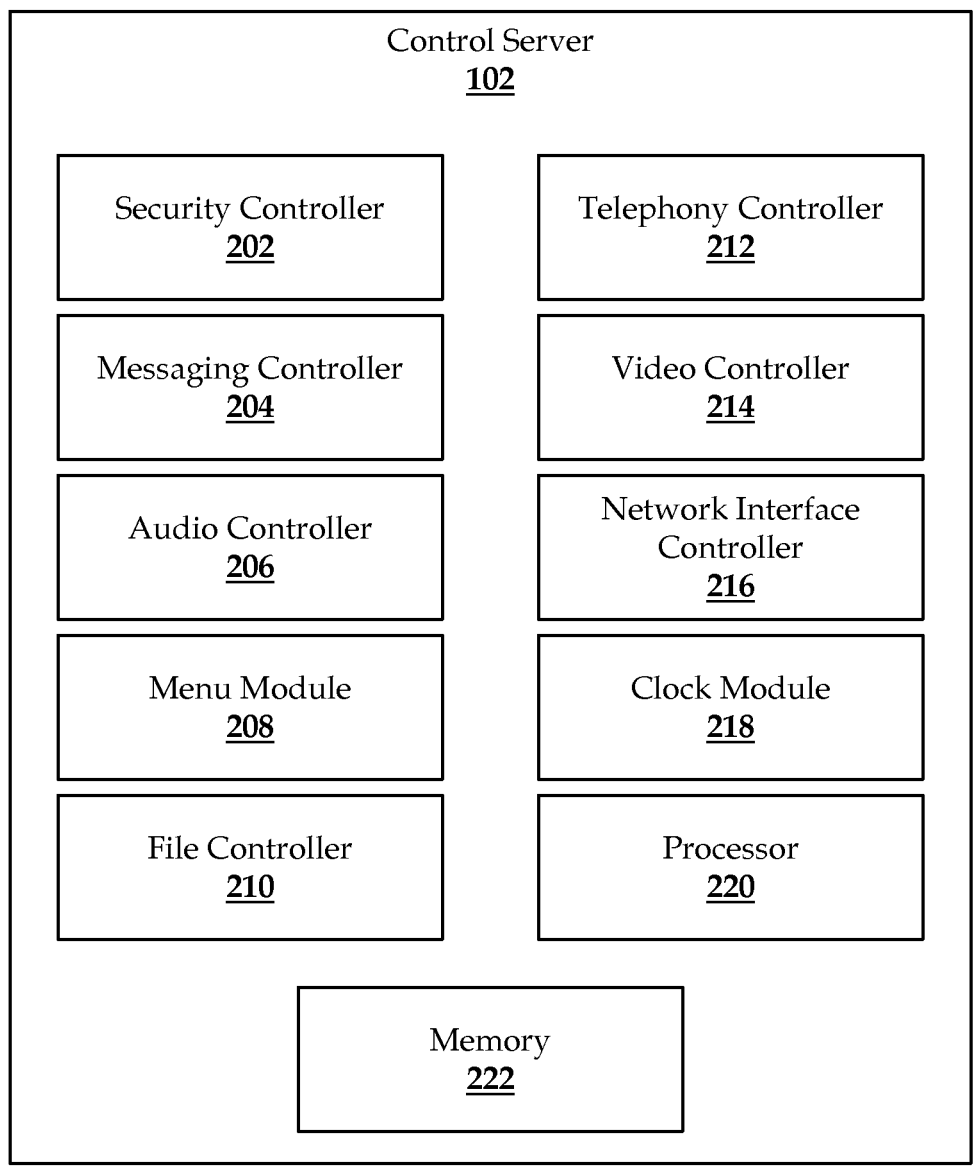
FIG. 2 illustrates a block diagram depicting a control server of the security system, according to an embodiment of the present invention.

FIG. 2 illustrates a block diagram depicting a control server 102 of the security system 100, according to an embodiment of the present invention. The control server 102 includes a security controller 202, a messaging controller 204, an audio controller 206, a menu module 208, a. file controller 210, telephony controller 212, a video controller 214, a network interface controller 216, a clock module 218, a processor 220, and a memory 222. The control server 102 may further include application software and data for enabling the above controllers.

The security controller 202 enables the control server 102 to interact with and/or manage various system component of the security system 100. In an embodiment, the security controller 202 controls and/or monitors feedback from the plurality of sensors that form a part of the security system 100. In one embodiment, the security controller 202 receives feedback from one or more motion sensors placed within the controlled environment 122 or in external locations surrounding the controlled environment 122. In an embodiment, the feedback activates the camera 112 and/or an audio means within the vicinity of the detected motion. In another embodiment, such feedback activates a security alarm or signals the control module 116. To signal the user, the control module 116 can vibrate, ring, flash a message, or the like. The camera 112 may be moved and/or focused in a particular direction and particular location within the controlled environment 122. In an embodiment, the security controller 202 is operable to lock or unlock doors, windows, or entryways in response to user's input at the control module 116. Further, in an embodiment, the security controller 202 interfaces with a fire and safety control system within the controlled environment 122. As such, the plurality of sensors is feed into control server 102 and may enable a user to log in and monitor emergency situations. The user can be authorized via the security controller 202 to log into the control server 102 over the Internet from the remote command center 120 and receive live feeds from the camera 112, archived feeds from the camera 112, or broadcasts feed from the media device 118.

The messaging controller 204 enables centralized storage of telephone calls received via the telephony controller 212. Voice messages are written to a memory of the ARU 114. The messaging controller 204 enables messages including audio, video, and/or text to be created, stored, and/or retrieved within the security system 100. The user can operate the control module 116, a telephone (not shown), or an audio means to create a message for another user. The messaging controller 204 may also enable the control server 102 to interact with a computing device to communicate, search and/or retrieve data from the computing device.

The audio controller 206 manages the exchange of audio signals within the security system 100. Accordingly, the audio controller 206 receives and/or distributes audio signals for one or more audio components, such as, for example, a voice auditory/audio means, speakers coupled to the computing device, the media device 118 or the control module 116. The audio controller 206 may receive audio signals from the ARU 114 and distribute the audio signal to the voice auditory/audio means and the control module 116. Further, the audio controller 206 may store an audio stream in the ARU 114 for future recall. In an embodiment, the audio controller 206 reads and/or writes to an internal storage medium that is designated for audio, and hence distributes audio to and from its internal storage medium. The audio controller 206 may query a web site, for example, "MP3.com" to download a digital recording to be played at a media device or stored in the ARU 114. In an embodiment, the audio controller 206 encodes the audio stream to MPEG-3 format to produce compact disk (CD) quality in real time or near real time. In another embodiment, the audio controller 206 encodes the audio stream to produce detection data on the CD quality audio in real time or near real time.

The menu module 208 may manage one or more menus associated with one or more devices in the controlled environment 122. The menu module 208 may direct storing and retrieval of menu items in the ARU 114. The menu module 208 is configured to interact with the control module 116 to receive one or more commands and direct a corresponding device to execute a function based on the one or more commands. In an embodiment, the control server 102 manages a clock associated with a device via the menu module. 208

The clock module 218 can set or synchronize a clock for one or more system components including the components of the ARU 114. The clock module 218 includes a real-time clock that can be set by the user through the control module 116. Alternatively, the real-time clock can be set via the Internet through the communication network 104. The clock module 218 uses its own real-time clock to set the clock of other system components by navigating a menu of the respective system component. Since the control server 102 tracks and monitors the state of the system components, the clock module 218 is programmable to navigate the menus of the system component to set the clock without interfering with the component's operations, such as when the media device 118 is on. In an embodiment, instructions for navigating a system component are stored in the ARU 114. For example, the input numbers for navigating the menus of a VCR or DVD distributor to set or program its internal clock can be memorized. The memorized numbers are associated with a set of infrared (IR) codes, which are stored at the control server 102. At the appropriate time, the IR codes are retrieved from an IR code database or library, and transmitted to the appropriate system component. Upon receipt, the IR codes are executed to navigate the menus to set the clock or retrieve detection data content.

The file controller 210 enables the control server 102 to function as a central file server for all personal devices in the controlled environment 122. The file controller 210 enables data to be stored and accessed by system components located within the controlled environment 122. In an embodiment, a device located outside the controlled environment is able to store and/or retrieve data via the file controller 210. For example, if a static internet protocol (IP) address is sustained by the internet service provider (ISP) of the security system 100, then a remote user could log into the control server 102 to retrieve and/or store data via the file controller 210.

The telephony controller 212 manages the distribution of telecommunications from conventional telephone paths and/or a television network. In an embodiment, the telephone is coupled to a conventional wired or wireless telephone path, such as POTS or PSTN. The telephone can also be coupled to a cellular or satellite communications path. A dedicated interface is provided to enable the cellular/satellite telephone means to interact with the security system 100. Calls or signals received or transmitted over the conventional path are also monitored and/or controlled by the control server 102. As such, the control server 102 is responsive to distributing detection and communication signals from the calls or the controlled environment 122 to other system components. For example, the user is able to directly operate the control module 116 to place and/or receive calls indirectly via the telephone when detection is enabled.

The video controller 214 manages the exchange of video signals within the controlled environment 122. The video controller 214 receives and/or distributes video signals for displays coupled, for example, to the computing device, the media device 118, or the control module 116. The video controller 214 also interacts with the components of the ARU 114. In an embodiment, the video controller 214 reads and/or writes to an internal storage medium that is designated for video in addition to or in lieu of the ARU 114 components. Accordingly, the video controller 214 receives video signals from the ARU 114 components and/or its internal storage medium and distributes the video signals to other system components such as the media device 118 and the control module 116. The video controller 214 can also receive a video stream from a source such as the Internet or the media device 118 and store the video stream in the ARU 114 or its internal storage medium for future references and viewing. For example, the video controller 214 can query a web site such as "www.bet.com" to download a music video to be played and/or stored to a system component while also checking for ongoing security at a current bet show. To enable distribution over the communications network 104 and or the Internet, the video controller 214 provides MPEG encoding. The video controller 214 is configured to receive, encode, and distribute a media and detected data stream in real time or near real time. In an embodiment, a network connection to the Internet enables the video controller 214 to implement broadband Internet access for audio/video distribution of security data associated with the controlled environment 122.

Further, the network interface controller 216 enables the control server 102 to communicate with the devices within or outside the controlled environment 122 via the communication network 104 and the Internet. The processor 220 is configured to process data received, stored or transmitted by the control server 102 in coordination with the various controllers described above. Processing of data may include reformatting or scaling of data (e.g., from a range of 0-65,535 to a human-interpretable range or meaningful units such as degrees Fahrenheit), combining or dividing various data or data fields, performing calculations on the data, comparing or correlating data, buffering the data, and so forth. The memory 222 is configured to store and hold data received at the control server 102. The memory 222 may be accessed by various controllers and the processor 220 for retrieving data stored therein.

Figure 3:
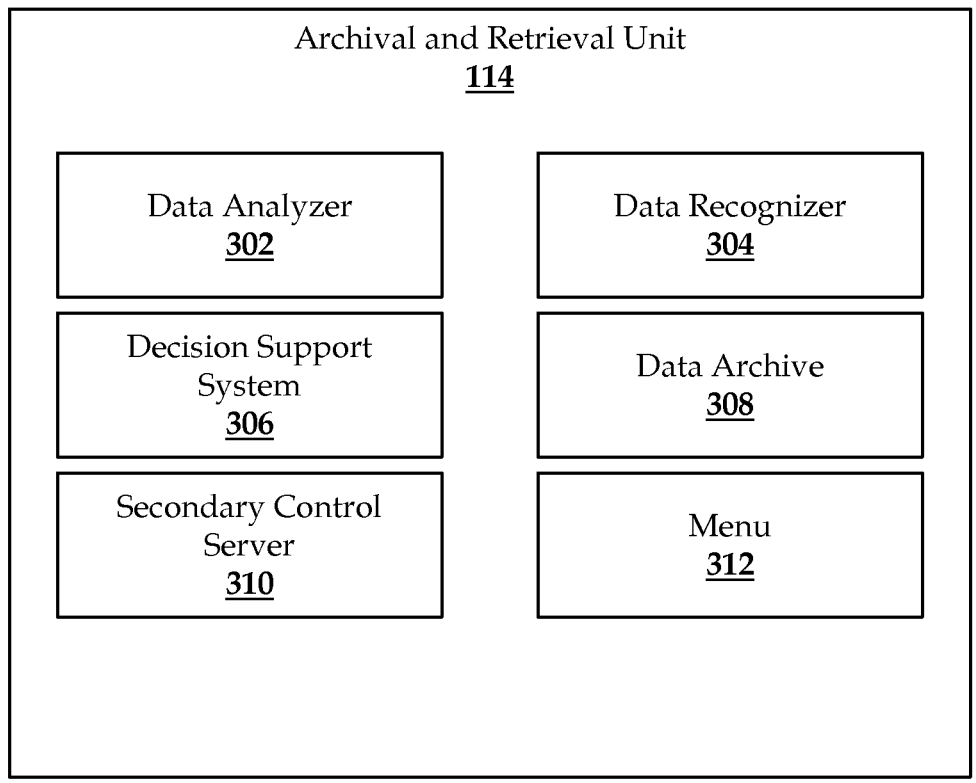
FIG. 3 illustrates a block diagram depicting an archival and retrieval unit of the security system, according to an embodiment of the present invention.

FIG. 3 illustrates a block diagram depicting components of the ARU 114, according to an embodiment of the present invention. In an embodiment, the ARU 114 includes a data analyzer 302, a data recognizer 304, a decision support system (DSS) 306, a data archive 308, a secondary control server 310, and a menu 312. The aforementioned ARU 114 components are not intended to be an exhaustive listing. Other ARU 114 components can be implemented and are deemed to be within the scope of embodiments of the present invention.

The ARU 114 is communicatively coupled to the control server. The ARU 114 is configured to receive compressed streams, filter the streams for metadata such as, date, time, and source and store the streams and metadata for future retrieval. The ARU 114 may be internal or external to the control server 102. The ARU 114 components may be centrally located or distributed throughout the controlled environment 122. In an embodiment, the ARU 114 components may be accessible from an external source such as, a web server device having communicating means over the global Internet via the communication network 104.

The data archive 308 provides one or more storage mediums for various data including video data, audio data, and metadata. In an embodiment, the data archive 308 may include a removable storage unit such as a zip disk, a floppy disk, or a compact disc-read only memory (CD-ROM). To support larger volumes of detection data, one or more integrated databases or a data warehouse system may be used to store the detection data and support the control server 102. In an embodiment, the data archive 308 may include a relational or object oriented (OO) component based database management system, or the like, that controls the analyzer, storing, retrieving, and updating of relevant data and metadata in the database records. The database management system also controls data integration, enforces integrity rules and constraints including detection data integrity and detection data referential integrity, and enforces security constraints. In an embodiment, the data archive 308 is a scalable system that stores data on multiple disk arrays. The detection and communication data warehousing can be implemented with the SQL Server 2000 application, which is available from Microsoft® Corporation, the Oracle® 9i database system is available from Oracle® Corporation or other similar proprietary products and services. Further, the data archive 308 may support Open Database Connectivity (ODBC) and/or Java Database Connectivity (JDBC) protocols. The data archive 308 may further include an index file database system and/or a planner file database system.

Secondary control server 310 receives audio and video signals from the television 412 and the plurality of sensors. In an embodiment, the secondary control server 310 may include radio or television tuners and programmers.

The data analyzer 302 can be a VCR distributor, DVD distributor, PVR, video server, virtual recorder, audio server, stereo, CD distributor, record distributor, audio tape or cassette distributor, digital audio tape recorder, and/or any other device or application that stores, records, generates, or plays back via magnetic, optical, electronic, or any other storage media. The IR codes may also be used to program the data analyzer 302 to record selected programs.

The data recognizer 304 records and plays back media and detected data and/or multimedia and detected data similar to the data analyzer 302 functions. However, the data recognizer 304 is further capable of loading multiple recordings such as CD or DVD to be played without having to be reloaded.

The DSS 306 may include a human body heat sensor to detect presence of a human body in the controlled environment 122. The DSS 306 may enable the security system 100 to determine presence and condition of a human body in the controlled environment 122. Further, the menu 312 may include one or more menus associated with one or more devices or components of the security system 100. The menu 312 may be stored in the data archive 308 or it may be external to the data archive 308 and stored in another storage medium such as a read only memory.

Figure 4:
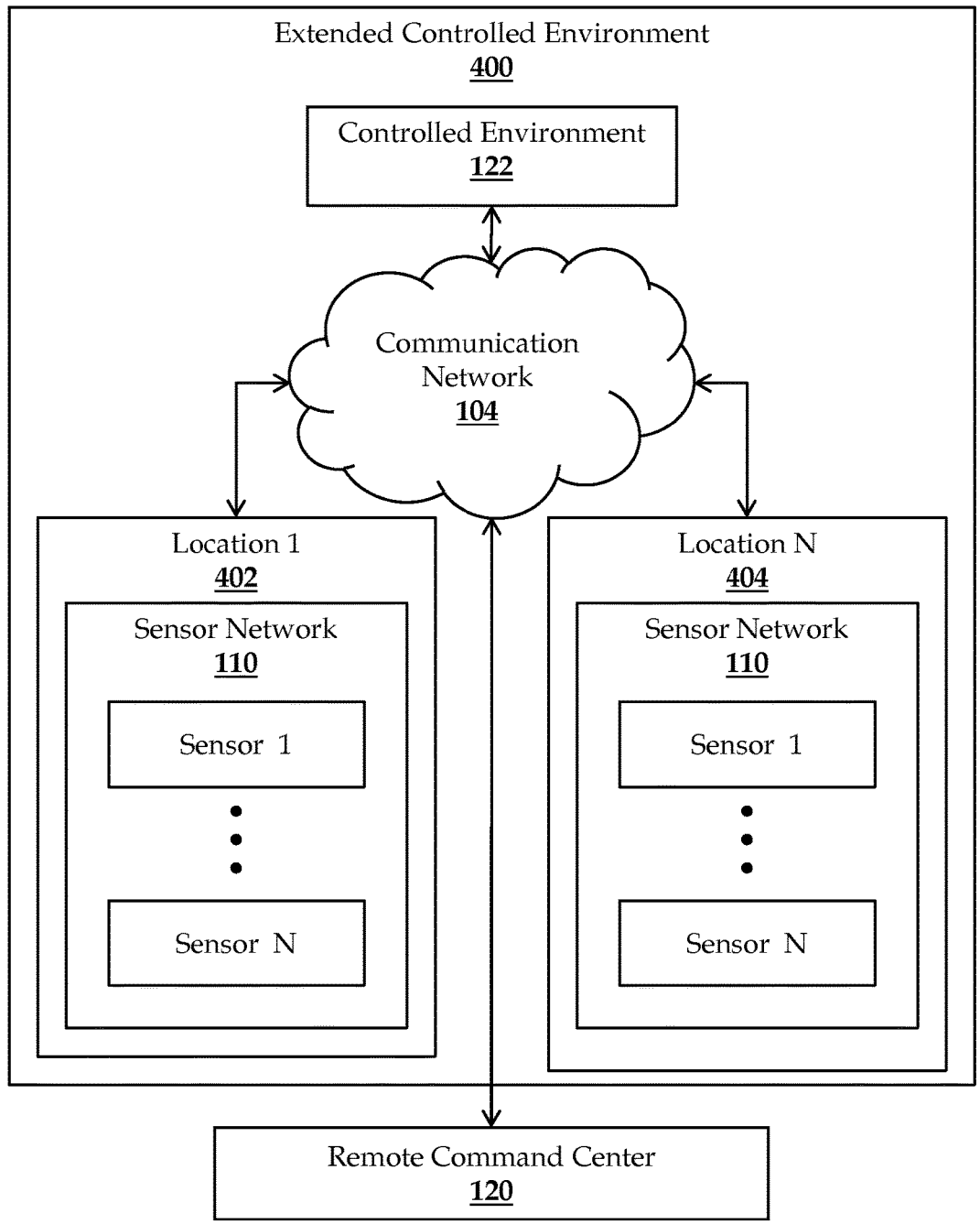
FIG. 4 illustrates a block diagram depicting an extended controlled environment, according to an embodiment of the present invention.

FIG. 4 illustrates a block diagram depicting an extended controlled environment 400, according to an embodiment of the present invention. The extended control environment 400 may include the controlled environment 122 and surrounding areas up to a predetermined distance from the boundaries of the controlled environment 122. The controlled environment 122 may include a home, an office, an educational institution, a medical institution, an industrial establishment, a residential building or any other commercial or residential space where monitoring and security of occupants is desired.

The extended controlled environment 400 may include one or more sensor networks at one or more locations. For example, the extended controlled environment 400 may include a location 1 402 having installed a sensor network 110. The extended controlled environment 400 may further include a location N 404 having installed another sensor network 110. The location 1 and the location N may be outside the controlled environment 122 but within the surrounding areas and included in the extended controlled environment 400. The controlled environment 100, the sensor networks 110 at locations 1-N may be communicatively coupled to the remote command center 120 via the communication center 120. Each sensor network 110 may include the plurality of sensors as described with reference to FIG. 1. Each sensor network 110 may send sensor data to the control server 102 of the controlled environment 122. The nature of the sensor data may depend upon the type of sensor that supplies the sensor data. For example, sensor data may include an analog measurement (e.g., a temperature measurement). Sensor data may also include images or streaming media (e.g., photos, videos, audio recording, etc.). Sensor data may also include a binary indication (e.g., whether something is present or not present, whether a measurement is above or below a threshold, etc.). In an embodiment, the controlled environment 122 includes a plurality of sections at locations 1-N, each section having at least one human body sensor and the at least one emergency condition sensor. Other characteristics and functions of the extended controlled environment 400 are similar to that of the controlled environment 122 and the security system 100 as described with reference to FIG. 1.

In an embodiment, the extended controlled environment 400 may further include an audio means (not shown). The audio means may include a wired or wireless audio system, such as a cell phone, stereo or audio voice server. The audio means may include a microphone as part of the security system 100. In an embodiment, the audio means includes one or more speakers with audio outputs located throughout the controlled environment 122.

Figure 5:
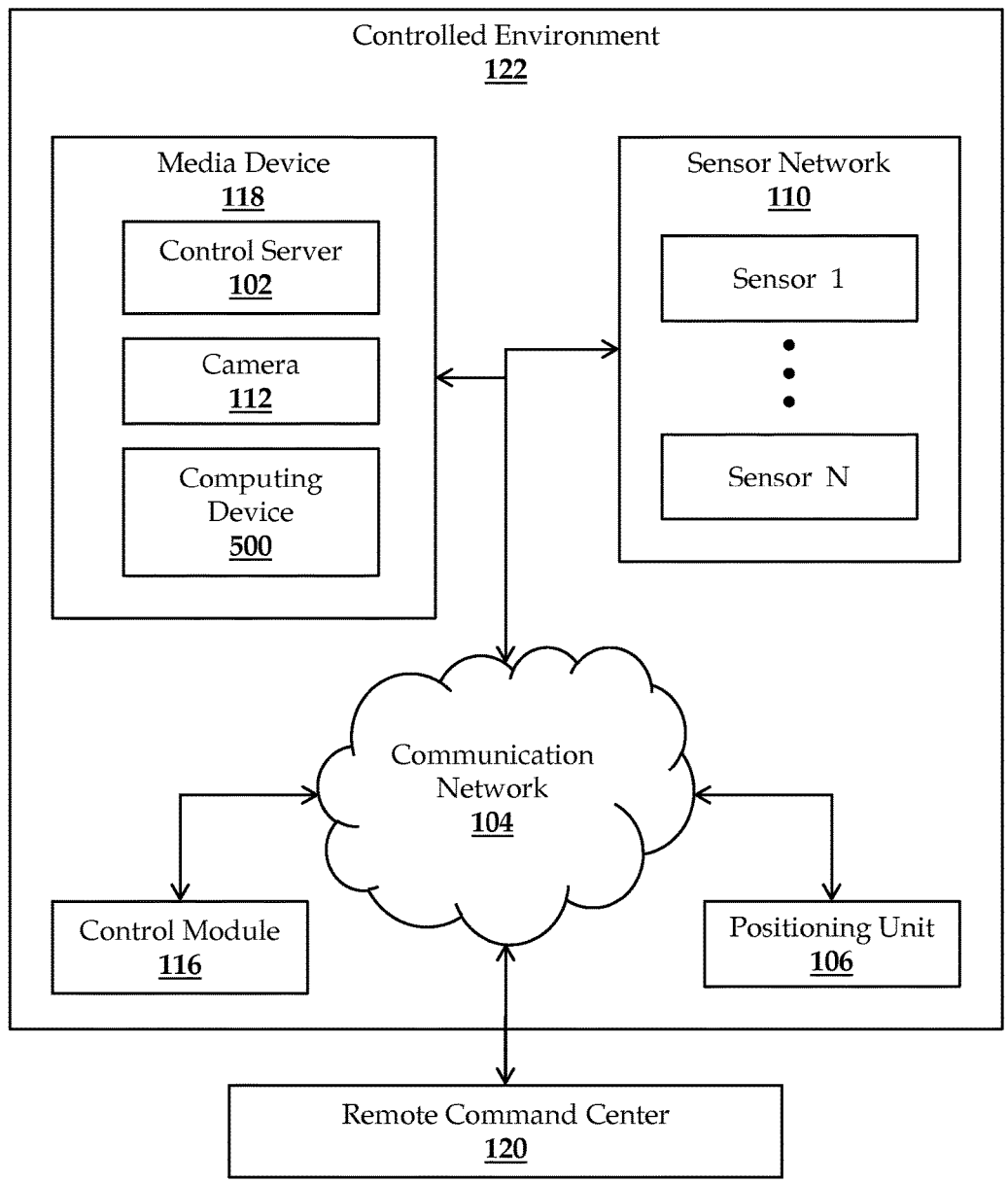
FIG. 5 illustrates a block diagram depicting a media device associated with a controlled environment, according to an embodiment of the present invention.

FIG. 5 illustrates a block diagram depicting a media device 118 associated with the controlled environment 122, according to an embodiment of the present invention. In this embodiment, the control server 102, the camera 112, and a computing device 500 are included in the media device 118. The media device 118 may be communicatively coupled to the sensor network 110, the control module 116, the positioning unit 106, and the remote command center 120 via the communication network 104. The media device 118 is configured for monitoring and security of the controlled environment. The media device 118 may include a command interface for receiving a command from the control module 116. The control module 116 being communicatively coupled to the media device 118. The media device 118 may further include a communication interface for receiving and transmitting data from the network of sensors via the communication network 104. The media device 118 may include a display for displaying media content and the sensor data. The media device 118 may further include a network interface for communicating with the remote command center 120 external to the controlled environment 122. The media device may further include the computing device 500. The computing device may include a processor. The processor is communicatively coupled to the command interface, the control module 116, the communication interface, the display, and the network interface. The processor is configured to receive detection data from the network of sensors. The processor is further configured to display the detection data on the display of the media device 118.

The processor is further configured to generate an alarm based on the sensor data and providing the alarm information to the remote command center 120. Generation of an alarm may proceed in various ways. For example, sensor data or a sensor status may be received by the processor from a sensor. The processor may then compare sensor data to a threshold, and generate the alarm if the sensor data is above a threshold (if higher sensor data is bad), or generate the alarm if the sensor data is below a threshold (if lower sensor data is bad). An alarm may also be generated if the sensor exhibits insufficient activity over time (e.g., if the sensor is defective). In other embodiments, a sensor status may be sufficient to generate an alarm without comparison to a threshold, e.g., if the sensor status indicates the presence of an unwanted object, or the lack of presence of a wanted object. Further details of the computing device 500 are explained with reference to FIG. 6 below.

In an embodiment, the media device 118 includes an interactive high definition television. The television may be a conventional television having embedded cameras with all features focused for enabling interactive detection and communication. In another embodiment, the television is enhanced to support interactive and personal services. The personal services may include monitoring, virtual recording, programming, pausing/rewinding live broadcasts, or the like. For example, the television can be a personal television with interactive means enhanced to support online communication and other radio frequencies transmission through web TV Networks or other conventional networks. In an embodiment, the television may include means for enabling communication through cable or satellite receptions and in connection to a device having at least a PVR, VCR, or DVD distributor/recorder.

Figure 6:
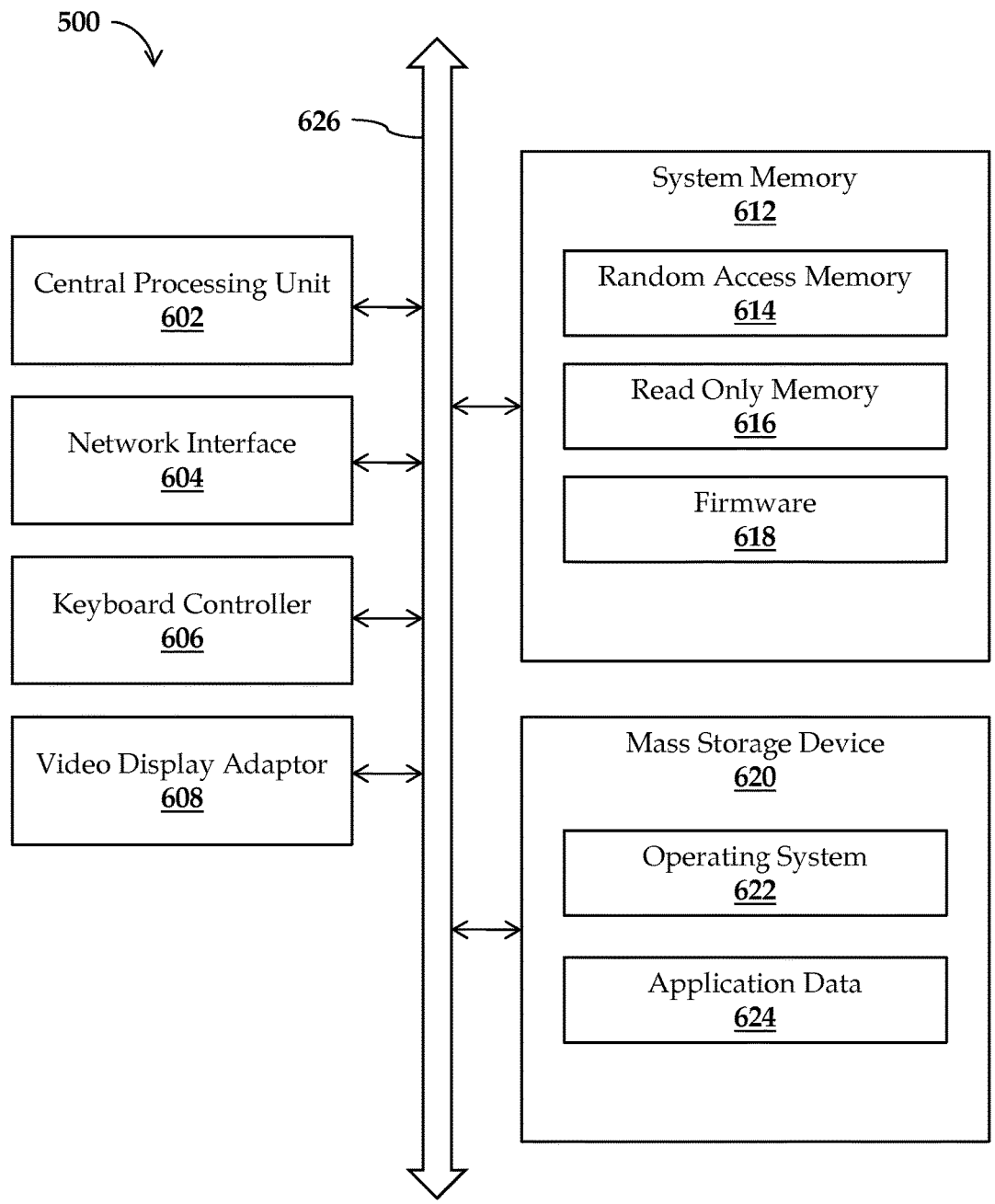
FIG. 6 illustrates a block diagram depicting a computing device at which one or more processing devices may be based, according to an embodiment of the present invention.

FIG. 6 illustrates a block diagram depicting the computing device 500 at which one of more processing devices may be based, according to an embodiment of the present invention. The following discussion is intended to provide a brief, general description of a suitable computing environment in which one or more components or devices of embodiments of the present invention may be implemented. Those skilled in the art will appreciate that the embodiments may be practiced with other computing device system configurations, including hand-held devices, multiprocessor systems, microprocessor-based or programmable consumer electronics, minicomputer devices, mainframe computing devices, and the like. The embodiments of the present invention may also be practiced in distributed computing environments where tasks are performed by remote processing devices that are linked through a communications network. In a distributed computing environment, program modules may be located in both local and remote memory storage devices. Computing device architecture for the computing device 500 utilized in the various embodiments of the present invention will be described. The computing device architecture illustrates a conventional computing device, including a central processing unit (CPU) 602, a system memory 612, including a random access memory (RAM) 614, a read only memory (ROM) 616, firmware 618, and a system bus 624 that couples the system memory 612 to the CPU 602. In an embodiment, the CPU 602 may comprise a general purpose microprocessor from INTEL® CORPORATION. For instance, the CPU 602 may comprise a PENTIUM 4® or XEON® microprocessor from INTEL® CORPORATION. It should be appreciated that any type of CPU may be utilized including INTEL-compatible devices from AMD® MIPS processors, POWERPC® devices from IBM®, or other types of RISC or CISC processors. The ROM 616 may store the firmware 618 for use in operating the computing device 500, such as a BIOS or an extensible firmware interface (EFI), containing the basic routines that perform basic platform initialization and prepare the computing device 500 to launch an operating system 622. The RAM 614 is a battery-backed memory device that may be used by the firmware 618 to store setting information for the computing device 500. In the case of an EFI firmware, the ROM 616 may be utilized to store configuration information.

The computing device 500 further includes a mass storage device 620 for storing the operating system 622 and application data 624. The mass storage device 620 is connected to the CPU 602 through a mass storage controller (not shown) connected to the bus 626. The mass storage device 620 and its associated computing device-readable media, provide non-volatile storage for the computing device 500. Although the description of computing device-readable media contained herein refers to a mass storage device, such as a hard disk or CD-ROM drive, it should be appreciated by those skilled in the art that computing device-readable media can be any available media that can be accessed by the computing device 500.

By way of example, and not limitation, computing device-readable media may comprise computing device storage media and communication media. Computing device storage media includes volatile and non-volatile, removable and non-removable media implemented in any method or technology for storage of information such as computing device-readable instructions, data structures, program modules or other data. Computing device storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing device 500.

According to various embodiments of the present invention, the computing device 500 may operate in a networked environment using logical connections to remote computing devices through the communication network 104, and the Internet. The computing device 500 may connect to the Internet through a network interface 604 connected to the bus 626. It should be appreciated that the network interface 604 may also be utilized to connect to other types of networks and remote computing device systems. The computing device 500 may also include a keyboard controller 606 for receiving input from a keyboard and a video display adapter 608 for providing output to a display screen.

Figure 7:
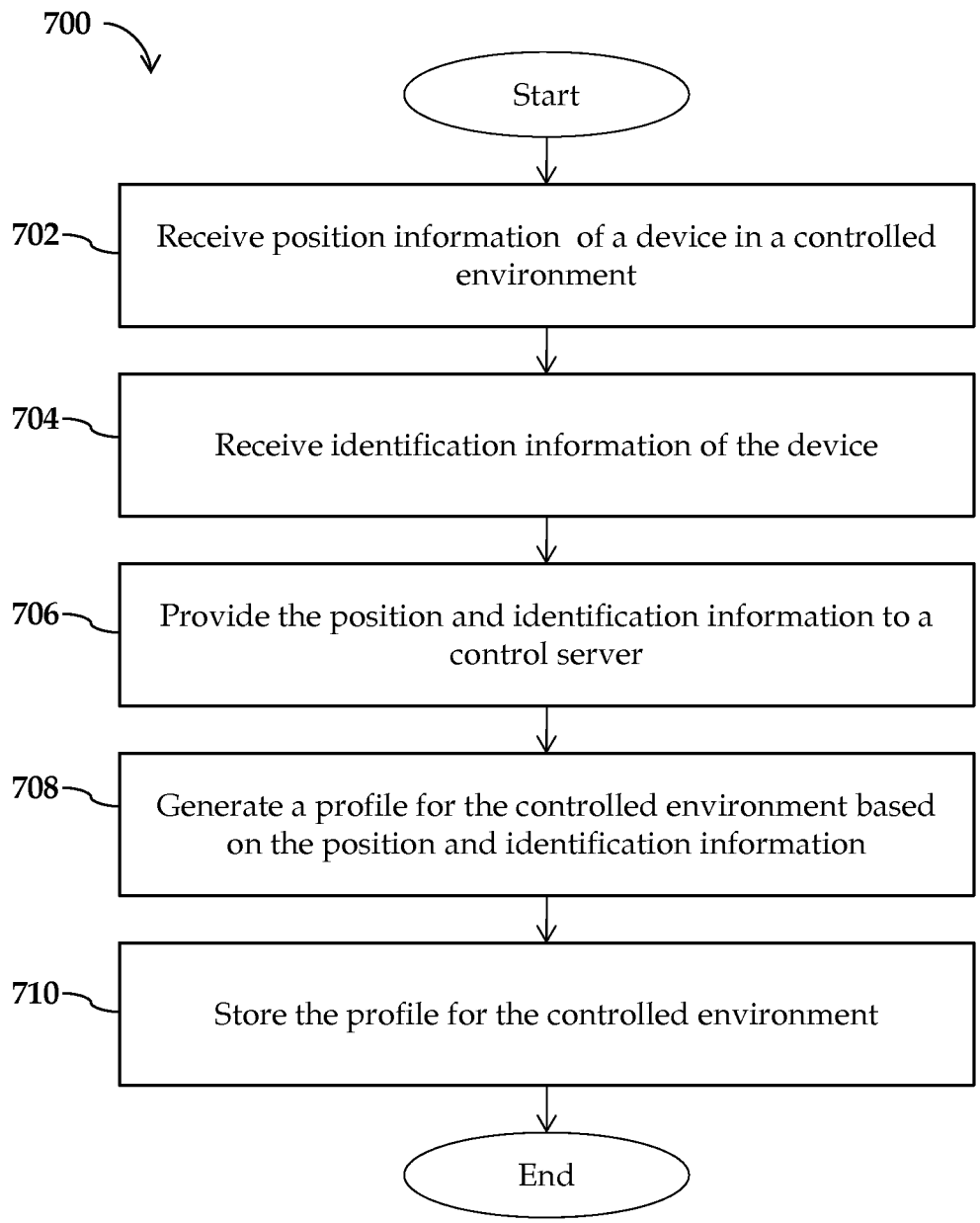
FIG. 7 depicts a flowchart of a method for generating a profile of a controlled environment, according to an embodiment of the present invention.

FIG. 7 depicts a flowchart of a method 700 for generating a profile of the controlled environment 122 or the extended controlled environment 400, according to an embodiment of the present invention. The method 700 starts at step 702. At step 702, position information of a device or a system component located in the controlled environment 122 is received. Embodiments may determine the current position of any of the aforementioned system components. The present invention includes various embodiments for accessing locator codes and/or a vicinity identifier. For instance, in the described embodiment, a user interacts with a text or graphical interface to manually enter the current location for an intelligent component. In another embodiment, a voice command interface enables the user to enter voice commands for an intelligent component responsive for enabling verbally communicating through devices in current and distant location indicative of enabling communication to intruders from remote locations. In an embodiment, an intelligent component interacts with positioning unit 106 to access locator codes. The intelligent component may be the control module 116 and is coupled to the interrogator. The interrogator polls positioning unit 106 for a vicinity identifier. The vicinity identifier includes an infrared sensor having locator codes responsive for identifying the current location of detection activities and for identifying the location of users when detection is enabled for both or all system components. Further, the interrogator may be integrated with positioning unit 106 and connected to the control module 116 to enable interactive communication with an intelligent component. The intelligent component representing at least the control module 116 in communication with the interrogator and configured with a plurality of devices. As a result, the interrogator receives an identifier for communications with intelligent component to enable a locator code representing at least the vicinity where detection was enabled. The locator codes are then produced and transmitted by associating the identifier with the vicinity identifier for the interrogator.

At step 704, identification information of the device or the system component is received. At step 706, the position information and the identification information is provided to the control server. At step 708, the control server generates a profile for the controlled environment 122 based on the position and identification information of the devices or the system components. At step 710, the profile of the controlled environment 122 may be stored by the control server 102 at the data archive 308 for future reference or retrieval and method 700 ends.

Figure 8:
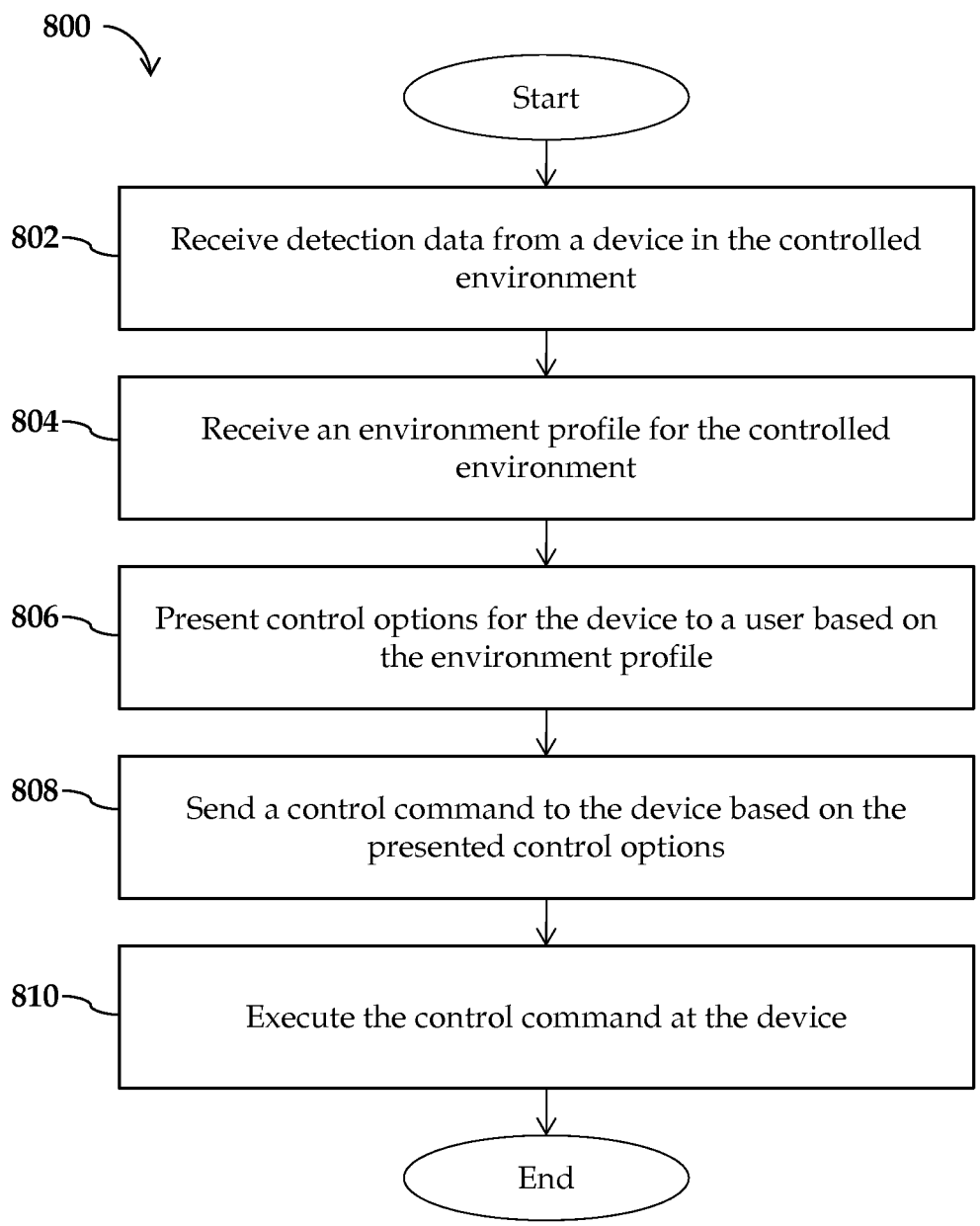
FIG. 8 depicts a flowchart of a method for controlling one or more devices of the security system, according to an embodiment of the present invention.

FIG. 8 depicts a flowchart of a method 800 for controlling one or more devices of the security system 100, according to an embodiment of the present invention. The method 800 starts at step 802. At step 802, detection data from a device in the controlled environment is received. The detection data may be received via the sensor network 110. At step 804, an environment profile for the controlled environment 122 is received. The environment profile for the controlled environment 122 may be retrieved from the ARV 114. The environment profile includes a listing of devices having links with distant destination and/or other device applications representing system components that receive commands and/or controls from the control server 102 and/or the control module 116.

At step 806, control options for the device are presented to a user based on the environment profile and the detection data. The control options include the listing of devices in communication with a device destination and/or other device applications corresponding to the environment profile. As described with reference to FIG. 1, the positioning can be determined remotely at the control server 102 or locally at the intelligent components such as cell phones, telephones, computing devices, portable wireless devices, or the control module 116. When detection is enabled and determined remotely, the control server 102, for example, produces description of the detection through interactive communication with plurality of devices having camera means and in wired/wireless communication with the control server 102. The control server 102 sends a user the detection data through an interface means with at least an intelligent component and enable displaying the detection and control options on the intelligent component such as the control module 116 or another system component that the user is operating. If transmitted data is determined locally, at least the intelligent component retrieves the environment profile data to enable the user to interface with the environments of the home to which detection was enabled and also with security agencies such as the fire department and the police department. The environment profile can be sent to the intelligent component on demand through wired/wireless means, or the intelligent component can be updated periodically with available environment data.

At step 808, a control command is sent to the device based on the presented control options. The user operates the intelligent component such as at least the control module 116 to send a request to control a system component such as the media device 118 that are identified in the environment profile. The user can send a request to control a function and/or an operation of a system component. The user can send a request to alter the configuration or security profile for the component. Other control request can be sent as would be suggested by one skilled in the relevant art. The control request can be transmitted directly to the designated component, or indirectly to the designated component via the control server 102.

At step 810, the device executes the received control command and the method 800 ends.

Figure 9:
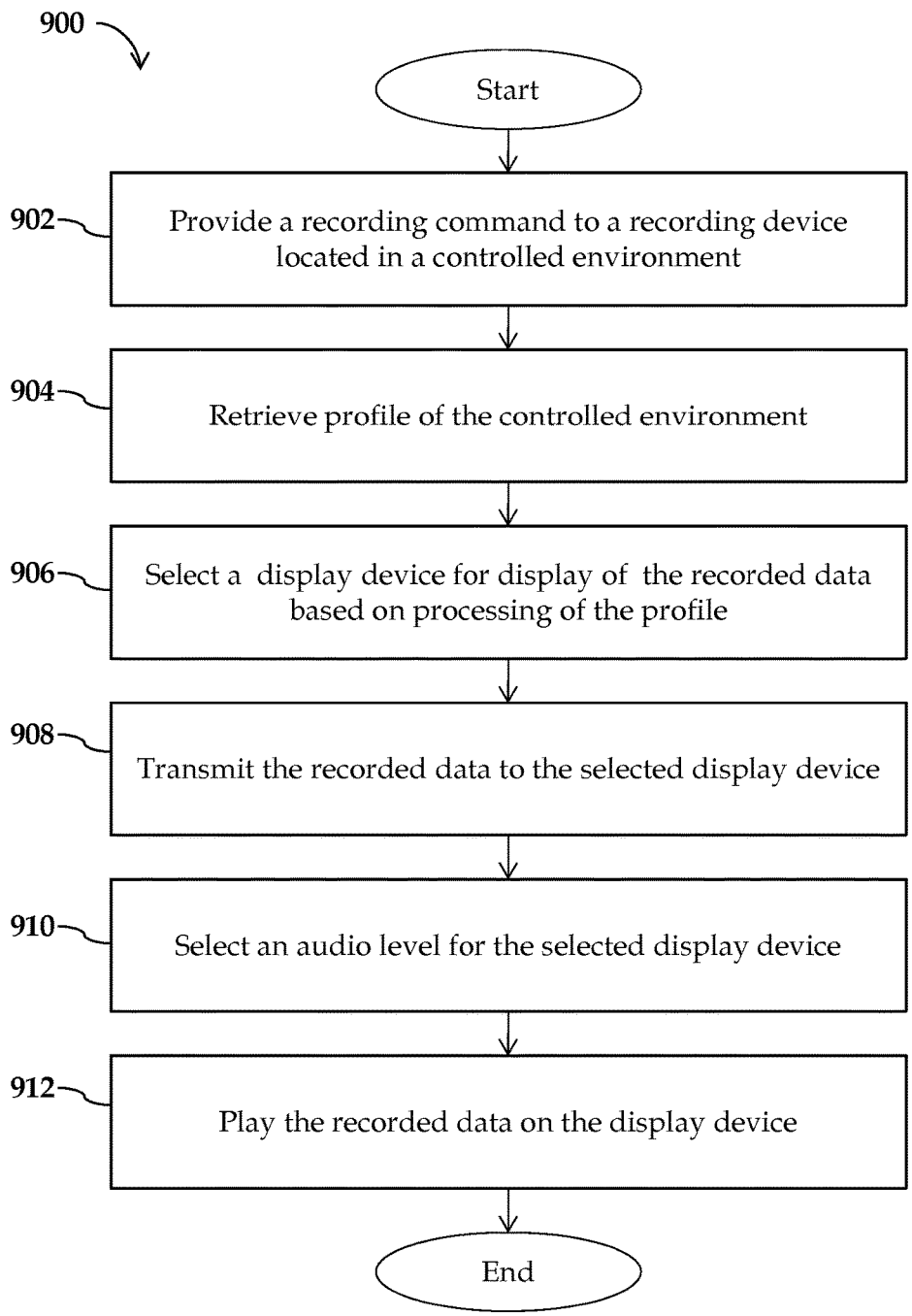
FIG. 9 depicts a flowchart of a method for handling sensor data of the controlled environment, according to an embodiment of the present invention.

FIG. 9 depicts a flowchart of a method 900 for handling sensor data of the controlled environment 122, according to an embodiment of the present invention. The method 900 starts at step 902. At step 902, a recording command is sent to a recording device located in the controlled environment. The recording can be a recorder coupled to the media device 118. At step 904, a profile of the controlled environment 122 is retrieved from the ARU 114. At step 906, a display device is selected for displaying of the recorded data based on processing of the profile. The selected display device may be the media device 118. At step 908, the recorded data is transmitted to the selected display device. At step 910, an audio level is selected for the selected display device. At step 912, the recorded data is played on the selected display device and the method 900 ends.

Figure 10:
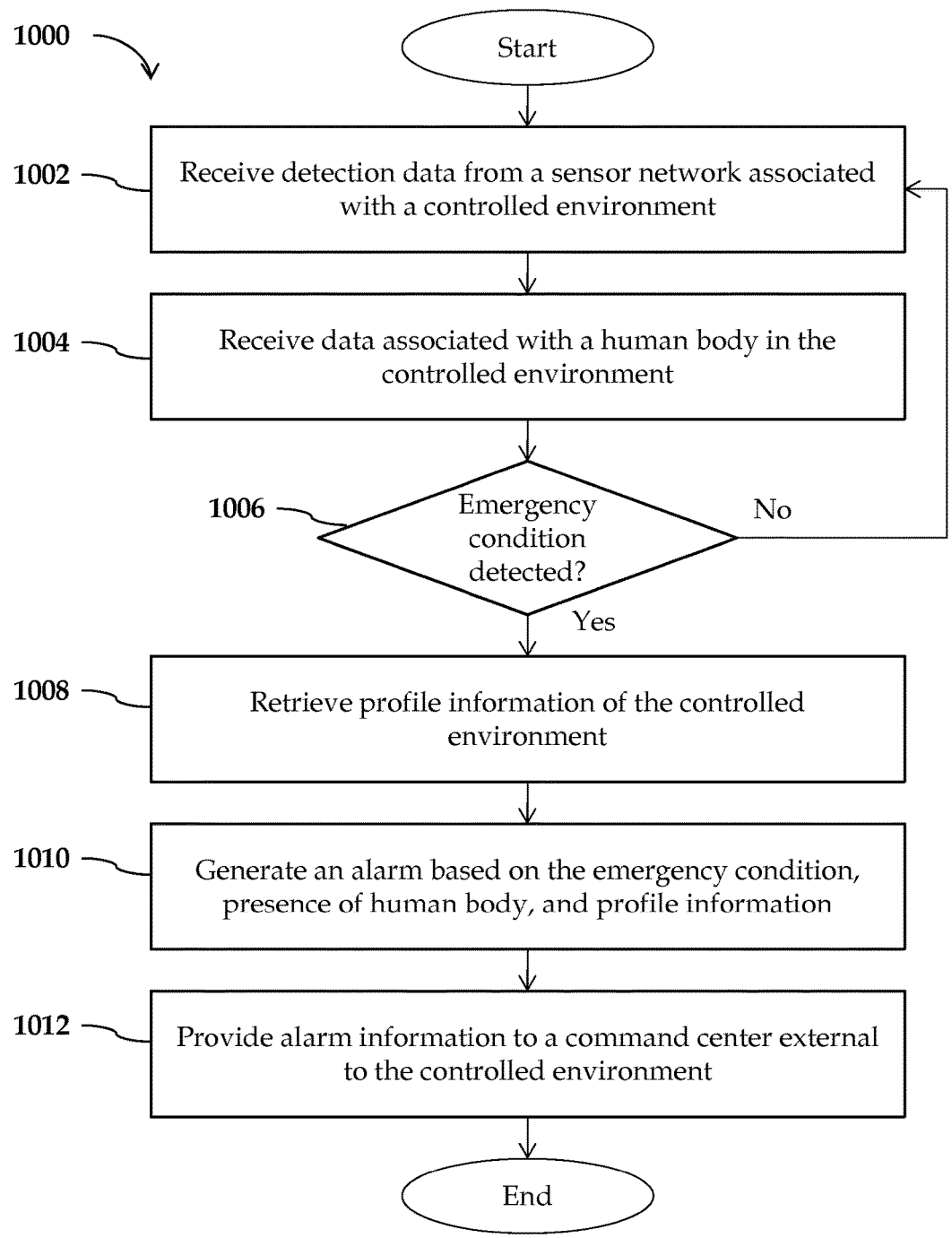
FIG. 10 depicts a flowchart of a method for generating an alarm based on sensor data of the controlled environment, according to an embodiment of the present invention.

FIG. 10 depicts a flowchart of a method 1000 for generating an alarm based on sensor data of the controlled environment 122, according to an embodiment of the present invention. The method 1000 starts at step 1002. At step 1002, detection data from the sensor network 110 associated with the controlled environment 122 is received at the control server 102. At step 1006, detection data from the sensor network 110 for detecting presence of a human body in the controlled environment 122 is received at the control server 102. The data received from the sensor network 110 is processed by the control server 102. At step 1006 it is determined whether an emergency condition exists in the controlled environment 122 based on the processed data. If it is determined at step 1006 that an emergency condition exists, the method 1000 proceeds to step 1008. If an emergency condition does not exist the method 1000 loops back to step 1002. At step 1008, a profile of the controlled environment 122 is retrieved from the ARU 114 by the control server 102. At step 1010, an alarm is generated based on the emergency condition, the presence of human body, and the profile information. At step 1012, alarm information is provided to the remote command center 120 external to the controlled environment 122 and the method 1000 ends.

Thus, the embodiments in accordance with the present invention provide an interactive security system, method, and device for monitoring a controlled environment, detecting an emergency condition in the controlled environment and generating an alarm based on existence of the emergency condition Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infrared data communications.

Also, while the flowcharts have been discussed and illustrated in relation to a particular sequence of events, changes, additions, and omissions to this sequence can occur without materially affecting the operation of embodiments of the present invention.

Various other embodiments may include variations and modifications of the present invention. It would be possible to provide for some features of the present invention without providing others.

For example in one alternative embodiment of the present invention, the system and method embodiments of the present invention may be implemented in conjunction with a special purpose computing device, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computing device, any comparable means, or the like.

In general, any device(s) or means capable of implementing the methodology illustrated herein can be used to implement the various aspects of this present invention. Exemplary hardware that can be used for embodiments includes computing devices, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computing device or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputing device systems being utilized.

In yet another embodiment of the present invention, the disclosed methods may be partially implemented in software that can be stored on a storage medium, executed on programmed general-purpose computing device with the cooperation of a controller and memory, a special purpose computing device, a microprocessor, or the like. In these instances, the system and method embodiments of the present invention can be implemented as program embedded on personal computing device such as an applet, JAVA® or CGI script, as a resource residing on a server or computing device workstation, as a routine embedded in a dedicated measurement system, system component, or the like. The system can also be implemented by physically incorporating the system and/or method into a software and/or hardware system.

Although the present application describes components and functions implemented in the embodiments with reference to particular standards and protocols, it is not limited to such standards and protocols. Other similar standards and protocols not mentioned herein are in existence and considered to be included in embodiments of the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in embodiments of the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use embodiments of the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

Home security detectors configured with the control components of the home comprising interactive detectors enhanced to support location-awareness and home occupant-awareness and functionality. The system includes at least one motion sensor configured with communication devices operatively arranged to transmit information about any motion of occupants in the various sections of the home as part of the information about the occupancy of the home during an emergency. At least one sensor is provided in various rooms of a home each sensing a state of the home. A central communication device is coupled, wired or wirelessly, directly or indirectly, to each home sensor configured to transmit the state of the home. The number of occupants in the home are determined by at least one body heat sensor and at least one heartbeat sensor each configured with the interactive detectors to detect the presence of emergency and home occupants and to know the present situations such as their heartbeats, such that the number of occupants and their locations are determinable from the number of detected body heat and their security and safety conditions are determinable by their heartbeats. The detection method includes the steps of sensing a state of the home and transmitting the state of the home to at least a server. Images of the home are captured by at least a camera means configured with at least a MOS and/or CMOS based active sensor array for producing real-time images and stored in the server for wireless retrieval. The images ideally include at least an intruder of the home. The server is configured with a central processor for enabling controlling security vigilance monitoring and for enabling rapid distribution of detection data, voice, and other detection signals within the monitoring environment. The system establishes a network which includes configuring home audio/visual devices, media destination means such as televisions, monitors, PDAs, notepads, notebooks, MP3, wireless stereo, cell phones etc. for the detection means. The control server supports video/audio servings, telephony, messaging, file sharing, internetworking, and security monitoring and allows home occupants to access and control the home network environment from any location within a controlled residential, commercial/industrial and/or non-residential, commercial/industrial environment with at least a computer means such as a cell phone.

A method for monitoring and providing security assistance to a home and home occupants, comprises the steps of: determining at least one fire-property or characteristics of occupancy of the home constituting information about the security and occupancy state of the home; automatically establishing a communication channel between the home and a remote facility without manual intervention to thereby enable the information about the security and the occupancy state of the home to be transmitted to the remote facility; at the remote facility, considering the information about the security and the occupancy state of the home received from the home and directing assistance to the home based on the transmitted information; the step of determining at least one fire-property or characteristic of emergency and the occupancy state of the home comprising the step of determining the number of occupants in the various sections, the number of occupants in the various sections being transmitted as part of the information about the occupancy state of the home; and wherein the step of determining the number of occupants in the home comprising the steps of receiving waves energy or radiation from all of the each locations in the various sections and determining the number of occupants in the various sections from the received waves, energy or radiation, the number of occupants in the various sections being transmitted as part of the information about the security and the occupancy state of the home.

In an embodiment, in the method for monitoring and providing security assistance to a home and home occupants, the step of determining the number of occupants in the home comprises the step of arranging at least one heartbeat sensor and at least one body heat sensor in the home to detect the presence of human heartbeats in the home such that the number of occupants is determinable from the number of detected body heat and the security is determinable from the number of detected heartbeats and or body heat.

A method for enabling security vigilant monitoring and communication comprises: a control server comprising a communication means configured to transmit various detection applications and communicatively connected to a at least an entertainment device comprising at least an interactive television; said interactive television responsive for viewing contents and said communication means comprising a wireless/wired device configured with method for using in-house communication control device to set a wireless/wired electronic device to join a wireless/wired local area network (LAN); said communication means further comprising sending a setup request from the control server configured with in-house entertainment devices comprising interactive detection means via at least a limited access connection; said setup request comprising a request to be compiled on the control server to the wireless/wired LAN for receiving a data package from at least said in-house entertainment device, said data package including at least a detection by the interactive detection means to enable network data distribution necessary for wireless/wired device to join the wireless LAN for utilizing the network data at the control server to establish a full access connection to an access point of at least a home; said communication means configured with said interactive detectors in communications with said control server comprising: at least a modem; computer means comprising a microprocessor, at least one memory means, at least an input/output means configured with at least one input/output; said communications means connected to the communication control device and configured for selectively and simultaneously transmitting and receiving analog and digital images; said control server in communication with least wireless/wired communication means; said communication control device providing at least a wireless/wired interconnectivity of the control server and a wireless/wired network through the communications means in wireless communication with at least a local internet service provider portal to the network, at least a satellite network; said interactive television comprising at least a media device responsive to normal read-only data, and the computer means having operating software contained on one of the memory means; and at least a logic means is configured with at least a software configured for in-house positioning and communications.

In an embodiment, the method for enabling security vigilant monitoring and communication further comprises the steps of: said interactive detection sensing a state of the home, a state of occupancy of the home, and/or a state of a component of the home; transmitting the state of the home, the state of occupancy of the home, and/or the state of the component of the home to at least a control server; sensing a state of the environment around and exterior of the home; and transmitting information about the environment of the home.

In an embodiment, the method for enabling security vigilant monitoring and communication further comprises the steps of: monitoring and providing assistance to a home, comprising the steps of: determining at least one fire-property or characteristic of occupancy of the home constituting information about the security and occupancy state of the home; determining at least one state of the home or of a component of the home constituting information about the operation of the home; selectively and automatically establishing a communication channel between the home and a remote facility without manual intervention to thereby enable the information about the security and occupancy state of the home and the information about the operation of the home to be transmitted to the remote facility to enable assistance to be provided to the home based on the transmitted information; at the remote facility, considering the information about the security and occupancy state of the home and the information about the operation of the home received from the control server, said control server directing assistance to the home based on the transmitted information; and the step of selectively and establishing a communication channel between the home and a remote facility without manual intervention comprising the step of addressing a transmission of information about the security and occupancy state of the home differently from a transmission of information about the operation of the home.

In an embodiment, the method for enabling security vigilant monitoring and communication further comprises the steps of: obtaining images of the various sections of the home; and transmitting the images of the various sections after an emergency and/or a break-through involving the home; determining when the home experiences a break-through, the step of obtaining images of the various sections of the home comprising the step of obtaining images including the image of an intruder of the home; and transmitting the images of the various sections just prior to the break-through once it has determined that the home has experienced a break-through.

In an embodiment, in the method for enabling security vigilant monitoring and communication, the step of determining at least one fire-property or characteristic of occupancy of the home comprises the step of determining any motion in the various sections of the home, whereby information about any motion of occupants in the various sections is transmitted as part of the information about the security and occupancy state of the home; and determining the number of occupants in the various sections, the number of occupants in the various sections being transmitted as part of the information about the security and occupancy state of the home.

In an embodiment, in the method for enabling security vigilant monitoring and communication, the step of determining the number of occupants in the home comprises the steps of receiving waves or radiation energy from all of the each locations in the various sections of the home and determining the number of occupants in the various sections from the received waves, energy or radiation, and arranging at least one heartbeat sensor and at least a body heat sensor in the various sections of the home to detect the presence of heartbeats and body heat in the home such that the number of occupants is determinable from the number of detected body heat and security is determinable by at least the heartbeats.

The foregoing discussion of embodiments of the present invention has been presented for purposes of illustration and description. It is not intended to limit the present invention to the embodiments, form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention that embodiments of the present invention require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

What is claimed is:

1. An interactive security system for occupancy detection, the system comprising:
a plurality of electronic sensors positioned at one or more predetermined locations in a controlled environment to collect sensor data, the controlled environment being a building, a room, or designated area within the room, the controlled environment being a space within which monitoring or security of a human occupant is desired, the plurality of electronic sensors comprising a heartbeat sensor configured with an interactive detector, the heartbeat sensor configured to detect either a presence or an absence of a human heartbeat in the controlled environment, the human heartbeat being of the human occupant for which monitoring or security is desired, the interactive detector configured to detect a presence of an emergency condition in the controlled environment, the emergency condition being different from the presence or the absence of the human heartbeat; and
a controller communicatively coupled to the heartbeat sensor and the emergency condition sensor, the controller configured to:
retrieve an environment profile of the controlled environment, the environment profile including position and identification information of devices located in the controlled environment and a listing of devices having links with the controller;
generate an alarm based on information in the environment profile, the presence of the emergency condition, and either the presence or the absence of the human heartbeat in the controlled environment; and
transmit the alarm to a remote command center external to the controlled environment via a communication network.

2. The system of claim 1, wherein the emergency condition sensor comprises a sensor selected from the group consisting of: a smoke sensor, a fire sensor, a temperature sensor, a break-through sensor, a pressure sensor, a body heat sensor, a sound sensor, and a voice sensor.

3. The system of claim 1, wherein the controlled environment comprises a plurality of locations, each of the plurality of locations comprising at least one of the plurality of electronic sensors.

4. The system of claim 1, wherein the human heartbeat comprises a plurality of human heartbeats.

5. The system of claim 4, wherein the controller is further configured to determine a number of human occupants based at least in part on a detection of the presence of the human heartbeats.

6. The system of claim 5, wherein the controller is further configured to determine the number of the human occupants based at least in part on a detection by at least one of the plurality of electronic sensors other than the heartbeat sensor.

7. The system of claim 1, further comprising an archival and retrieval unit coupled to the controller, the archival and retrieval unit configured to receive, store, and recall the sensor data.

8. The system of claim 7, further comprising the communication network, the communication network configured to enable communication among at least one of the plurality of electronic sensors, the controller, and the archival and retrieval unit.

9. A method of emergency condition detection in a controlled environment, the method comprising:
receiving, by a processor, sensor data for the controlled environment from a plurality of electronic sensors associated with the controlled environment, the sensor data including heartbeat sensor data and emergency condition sensor data from a heartbeat sensor configured with an interactive detector, the controlled environment being a building, a room, or designated area within the room, the controlled environment being a space within which monitoring or security of a human occupant is desired;
processing, by the processor, the heartbeat sensor data to determine either a presence or an absence of a human heartbeat in the controlled environment, the human heartbeat being of the human occupant for which monitoring or security is desired;
processing, by the processor, the emergency condition sensor data to determine whether an emergency condition exists in the controlled environment, the emergency condition being different from the presence or the absence of the human heartbeat;
retrieving, by the processor, an environment profile of the controlled environment, the environment profile including position and identification information of devices located in the controlled environment and a listing of devices having links with the processor;
generating, by the processor, an alarm based on information in the environment profile, a determination that the emergency condition exists, and a determination of either the presence or the absence of the human heartbeat in the controlled environment; and
transmitting, from the processor, the alarm to a remote command center external to the controlled environment via a communication network.

10. The method of claim 9, wherein the emergency condition sensor comprises a sensor selected from the group consisting of: a smoke sensor, a fire sensor, a temperature sensor, a break-through sensor, a pressure sensor, a body heat sensor, a sound sensor, and a voice sensor.

11. The method of claim 9, wherein the controlled environment comprises a plurality of locations, each of the plurality of locations comprising at least one of the plurality of electronic sensors.

12. The method of claim 9, wherein the human heartbeat comprises a plurality of human heartbeats.

13. The method of claim 12, further comprising determining, by the processor, a number of human occupants based at least in part on the heartbeat sensor data.

14. The method of claim 13, wherein the determining the number of the human occupants is further based at least in part on a detection by at least one of the plurality of electronic sensors other than the heartbeat sensor.

15. An interactive security media device for monitoring and occupancy detection, the media device comprising:
a command interface configured to receive a command from a control module, the control module being communicatively coupled to the interactive security media device;
a communication interface configured to receive sensor data from a plurality of electronic sensors positioned at one or more predetermined locations in a controlled environment, the controlled environment being a building, a room, or designated area within the room, the controlled environment being a space within which monitoring or security of a human occupant is desired, the plurality of electronic sensors including a heartbeat sensor configured with an interactive detector, the sensor data including heartbeat sensor data and emergency condition sensor data;
a display configured to display at least one of media content or the sensor data;
a network interface configured to communicate with a remote command center external to the controlled environment;
a processor communicatively coupled to the command interface, the control module, the communication interface, the display, and the network interface, the processor configured to:
process the heartbeat sensor data to determine either a presence or an absence of a human heartbeat in the controlled environment, the human heartbeat being of the human occupant for which monitoring or security is desired; and
process the emergency condition sensor data to determine whether an emergency condition exists in the controlled environment, the emergency condition being different from the presence or the absence of the human heartbeat;
retrieve an environment profile of the controlled environment, the environment profile including position and identification information of devices located in the controlled environment and a listing of devices having links with the processor;
generate an alarm based on information in the environment profile, a determination that the emergency condition exists, and a determination of either the presence or the absence of the human heartbeat in the controlled environment; and
transmit the alarm to a remote command center external to the controlled environment via a communication network.

16. The interactive security media device of claim 15, wherein the human comprises a plurality of human heartbeats.

17. The interactive security media device of claim 16, wherein the processor is further configured to determine a number of human occupants based at least in part on the heartbeat sensor data.

18. The interactive security media device of claim 17, wherein the processor is further configured to determine the number of human occupants based at least in part on a detection by at least one of the plurality of electronic sensors other than the heartbeat sensor.

* * * * *